(No Model.) 3 Sheets—Sheet 1.
W. T. HOOFNAGLE.
TACK DRIVING MACHINE.
No. 527,985. Patented Oct. 23, 1894.
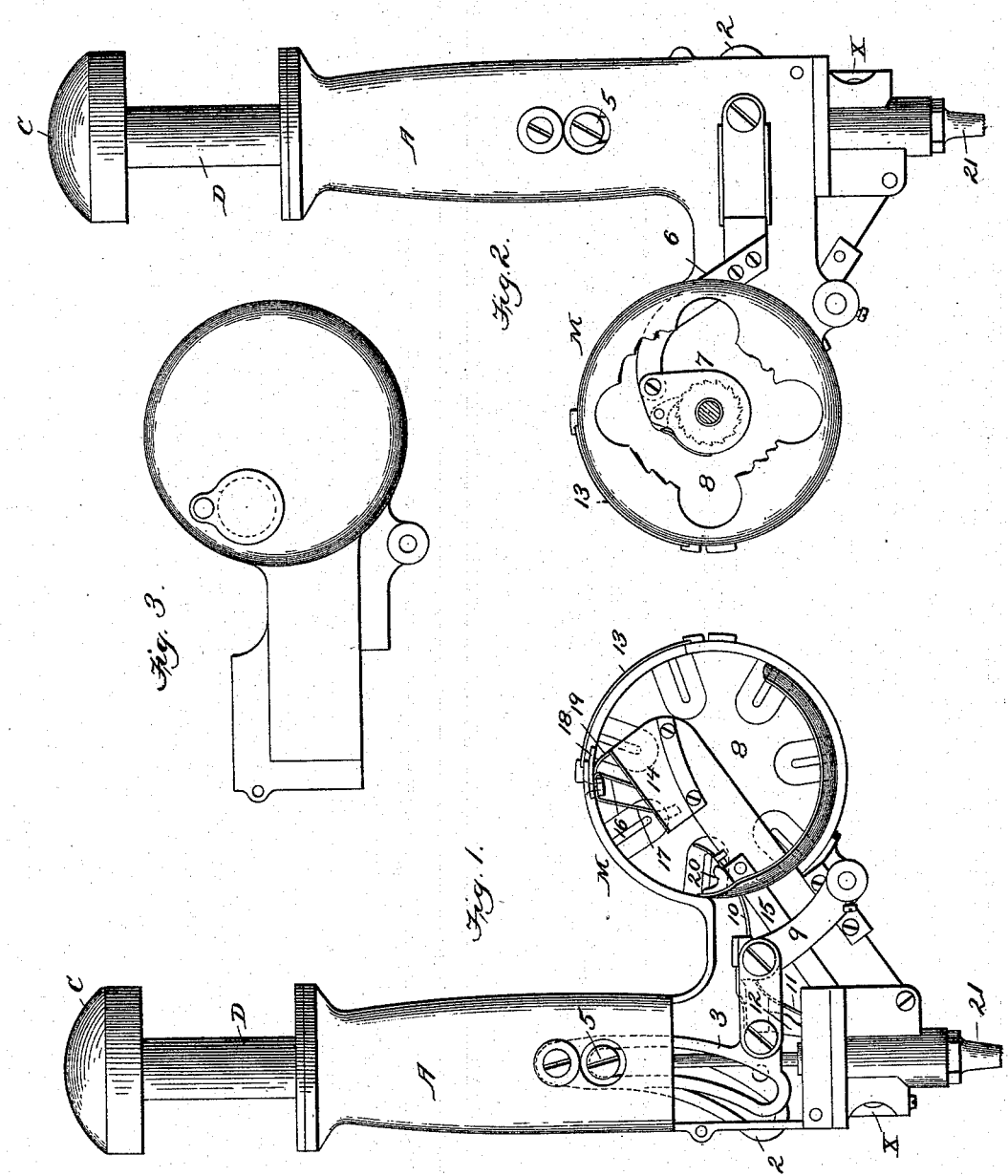

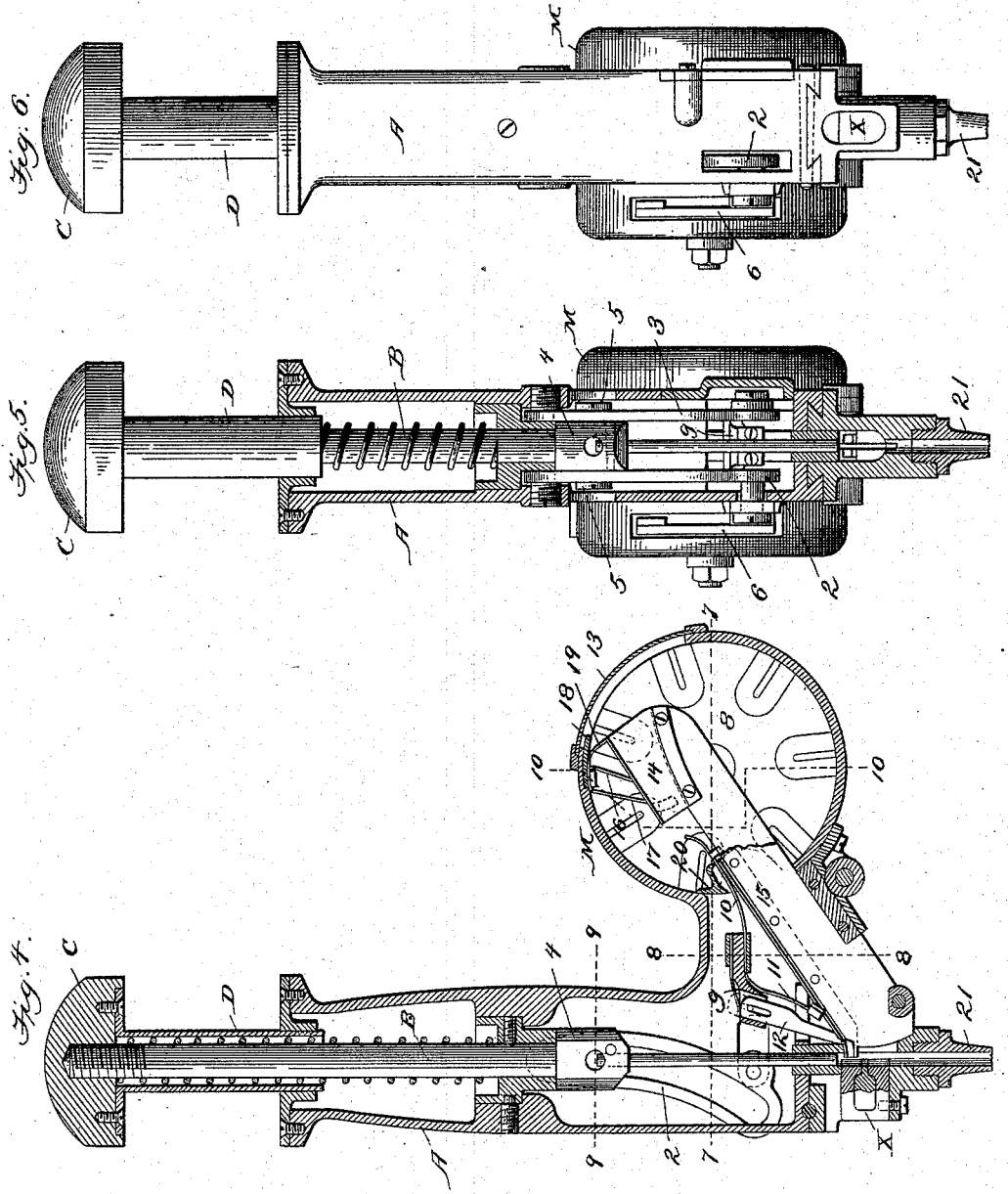

(No Model.) 3 Sheets—Sheet 3.
W. T. HOOFNAGLE.
TACK DRIVING MACHINE.
No. 527,985. Patented Oct. 23, 1894.
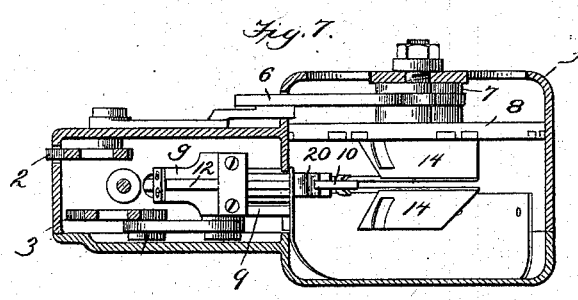
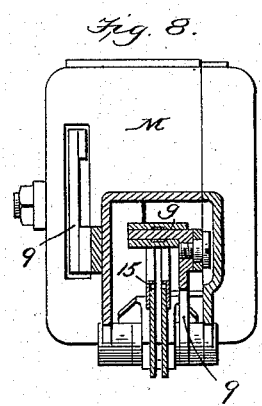
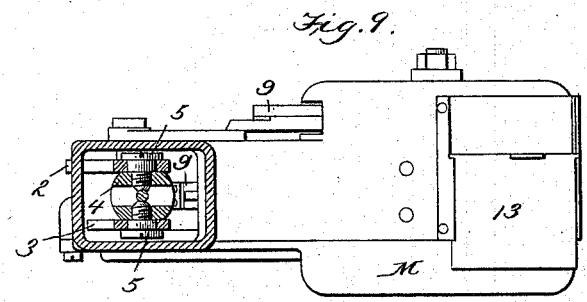
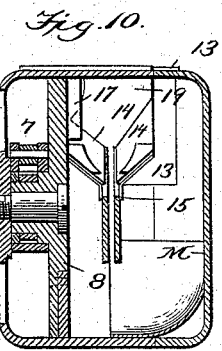
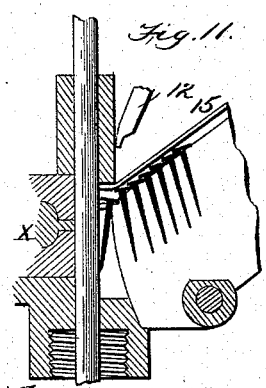
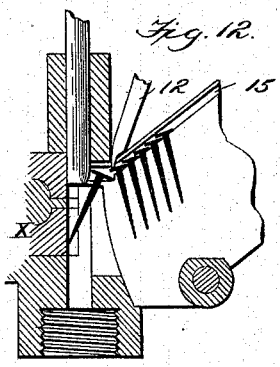
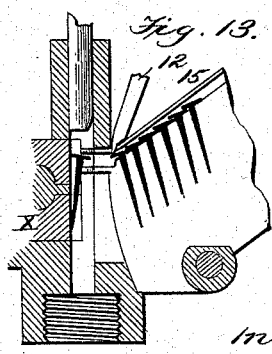
Witnesses
Edwin L. Bradford
Theo. L. Gatchel
Inventor
William T. Hoofnagle
by V. D. Stockbridge & Son.
Attorneys

UNITED STATES PATENT OFFICE.

WILLIAM T. HOOFNAGLE, OF BALTIMORE, MARYLAND.

TACK-DRIVING MACHINE.

SPECIFICATION forming part of Letters Patent No. 527,985, dated October 23, 1894.

Application filed October 3, 1893. Serial No. 487,102. (No model.)

*To all whom it may concern:*

Be it known that I, WILLIAM T. HOOFNAGLE, a citizen of the United States, residing in the city of Baltimore, in the State of Maryland, have invented certain new and useful Improvements in Tack-Driving Implements; and I do hereby declare that the following is a full, clear, and exact description of the invention, such as will enable others skilled in the art to which it appertains to make and use the same.

My invention relates to improvements in loose tack driving implements.

The object of the invention is to produce an improved implement which will automatically present nails or tacks to a plunger so that they can be driven with facility and without separate handling.

The invention consists in certain new devices and combinations hereinafter described and claimed.

In the drawings, Figure 1 is a side elevation of my new implement with the side-plate of the magazine or tack reservoir removed. Fig. 2 is an elevation of the side opposite that shown in Fig. 1. Fig. 3 is an elevation of the side-plate removed from the implement, as shown in Fig. 1. Fig. 4, is a vertical central section through the implement in the position shown in Fig. 1. Fig. 5 is a central vertical section through the implement in position at right angles with Fig. 4. Fig. 6 is an elevation from the side opposite the tack magazine. Fig. 7 is a horizontal section on the line 7—7. Fig. 8 is a vertical section on the line 8—8. Fig. 9 is a horizontal section on the line 9—9. Fig. 10 is a vertical section on the line 10—10, and Figs. 11, 12 and 13 are details showing tacks at different positions of the driver.

A is a handle or hand piece for handling the implement, and serves as a base or support for the several parts; also as a tube or barrel through which the tack-driving plunger B operates.

C is the head or knob adjustably connected with the plunger or driver and D is a sleeve or casing connected with the knob C. This sleeve serves as a substantial rigid guide for the upper part of the plunger and as a casing for inclosing the plunger-lifting spring. The knob and plunger being adjustably connected with each other, the distance between the shoulder of the knob and the point of the plunger may be varied at will and the thrust changed so as to drive a tack fully home or not as may be desired.

Connected with, and pivoted within the handle A, are slotted rocker arms 2 and 3, respectively, and connected with the plunger B is a block or cross-head 4, having pins 5—5 extending outward into cam slots in the rocker-arms. When the plunger is reciprocated, the pins, through the medium of the slots, vibrate the rocker-arms and one of these arms, through curved bar 6 and clutch device 7, operates to rotate a disk 8, hereinafter described. The other arm operates a vibrating arm 9, upon which is mounted a sliding piece 10, a feeding device 11 and a retainer 12.

M is a magazine or reservoir for tacks. This part is formed integral with the handle or is connected with the handle in any suitable way. It is provided with an opening for the introduction of tacks and the opening is closed by a slide or door 13. The bottom of the magazine is so formed as to incline toward the disk lifter 8. This disk lifter is mounted on a shaft extending through one side of the magazine, and is provided with a series of horse-shoe magnets whose poles, by preference, are next the periphery of the disk. As the disk revolves, tacks from the bottom of the magazine are lifted and carried to the upper part of the magazine and discharged to hopper 14 and thence to race-way 15. The hopper is arranged in the upper part of the magazine and discharges into the race-way. A brush or obstruction 16 is attached to the magazine adjacent to the lifter disk for the purpose of sweeping the tacks from the magnets to the hopper.

In some instances it is desirable to have a second or auxiliary brush or obstruction, as shown at 17, to insure the clearance of the lifter disk as it revolves. In addition to, or as auxiliary of the brushes, I arrange a soft iron armature 18 over the hopper to release the tacks from the influence of magnetism and permit them to drop by gravity to the hopper. This armature operates to reduce or neutralize the power of the magnet, upon the tacks, just as they are brought to the highest point above the hopper. The tacks being released from the magnetic force will drop by gravity into the hopper.

19 is a plate cut away next the lifting disk but arranged to close the end of the hopper opposite the race-way.

The race-way or track 15 extends from hopper to plunger-tube and at the juncture of these passages the race-way is stepped, as shown in Figs. 4, 11, 12 and 13, so as to permit the foremost tack in the race to drop away from its successor and to provide a space sufficient to permit the tack to swing to position in Figs. 12 and 13, without jamming.

X is a magnet in the body of the plunger tube opposite the race-way to draw the first tack into position as soon as it is freed from the plunger driver, as seen in Fig. 13.

The elastic brush 10, feeding device 11 and retainer 12 are mounted upon and move with vibrating arm 9. The sliding piece serves to prevent the tacks from clogging at or near their entrance to the covered part of the raceway. The feeder projecting through a slot in the cover of the raceway serves to propel or urge the tacks forward to the plunger-tube, and the retainer serves to intermittently hold and retain all except the foremost tack so that it may be separately drawn into the plunger tube. The retainer piece is pivoted through a slot with vibrating arm $g$ and has a spring bearing against its end as shown in Fig. 4. This provides an elastic or yielding action of the retainer and thus avoids breakage of parts in the event of a stoppage and jamming at the mouth of the race-way. A guard 20 is arranged, as shown, in the magazine above the race-way and the path of the sliding piece, to prevent tacks from lodging across the raceway.

I preferably make the driving plunger of steel, which, in use, adjacent to the magnet, becomes magnetized and operates to attract the forward tack, and hold it in position shown in Fig. 11. As the plunger rises and passes the front of the race-way, the forward tack takes the position shown in Fig. 12, and when it reaches its normal position the parts are in position shown in Fig. 13, the tack having been drawn by magnet X into the path of the plunger driver. Obviously, the magnet X will draw the tack into position shown in Fig. 13 whether the plunger driver be magnetized or not.

The nozzle 21 is detachably connected with the plunger tube or barrel, and a number of these of different lengths may be provided for each implement. In this way, the adjustment of the relative length of plunger and barrel may be effected so as to drive a tack partially or entirely home.

Having now described my invention, what I claim is—

1. The combination of a plunger tube, an inclined guide or raceway leading to said tube, a step or seat at the end of the raceway for a single tack, a driving plunger which serves when down to hold the single tack on its seat and a retaining device between the plunger and raceway for holding the column behind the seat when the plunger is up, substantially as described.

2. The combination of a plunger tube, a plunger reciprocating in and guided by said tube, a raceway opening laterally into the tube, means for delivering the tacks singly to the passage, and a magnet opposite the delivery end of the raceway to draw the tacks from the raceway and hold them in position to be driven by the plunger, substantially as described.

3. In a tack-driving implement, the combination of a plunger-tube or barrel, a stepped raceway leading to said tube, a retainer for retaining the column behind the foremost tack and a stationary magnet opposite the raceway for seating and holding the tack in the plunger tube, substantially as described.

4. In a tack-driving implement having a magnetic tack lifter arranged at one side of the tack receptacle, the combination with such lifter, of a hopper or chute and an armature arranged as and for the purpose described.

In testimony whereof I affix my signature in the presence of two witnesses.

WILLIAM T. HOOFNAGLE.

Witnesses:
T. O. HANLON,
J. H. GERTSBY.